United States Patent [19]

Keating

[11] Patent Number: 4,502,461

[45] Date of Patent: Mar. 5, 1985

[54] GRIDDLE CONTROL FOR MINIMUM TEMPERATURE VARIATION

[75] Inventor: Richard T. Keating, Oak Park, Ill.

[73] Assignee: Keating of Chicago, Inc., Bellwood, Ill.

[21] Appl. No.: 483,524

[22] Filed: Apr. 11, 1983

[51] Int. Cl.³ .................................................. F24C 3/00
[52] U.S. Cl. .................................. 126/39 K; 126/374; 219/450; 219/442; 236/99 D
[58] Field of Search ............... 126/39 R, 39 G, 39 H, 126/39 N, 39 J, 39 K, 374; 219/449, 450, 441, 442; 236/99 D; 99/422

[56] References Cited

U.S. PATENT DOCUMENTS

| | | | |
|---|---|---|---|
| 2,848,894 | 8/1958 | Pappas | 126/374 |
| 3,511,971 | 5/1970 | Keating | 219/449 |
| 3,710,076 | 1/1973 | Frazier | 219/449 |

*Primary Examiner*—Carroll B. Dority, Jr.
*Attorney, Agent, or Firm*—Charles W. Rummler

[57] ABSTRACT

A temperature control means for a cooking griddle wherein a tubular thermostat is clamped to the bottom of the griddle plate, shielded from direct engagement by the heating medium and having a predetermined portion of the temperature sensing bulb of the thermostat directly exposed to the heating medium for cooperation with the actuating fluid in the thermostat tube so as to operate the on-off switch of the heating medium within a temperature range of about 5 degrees F.

4 Claims, 4 Drawing Figures

GRIDDLE CONTROL FOR MINIMUM TEMPERATURE VARIATION

BACKGROUND OF THE INVENTION

Heretofore, in the operation of cooking griddles, the griddle temperature control means employed was not of sufficient sensitivity to the actual griddle plate temperature to prevent a high-low plate temperature range of less than about 15 to 20 degrees F. which required a considerable expense of heating energy to bring the plate temperature to the preferred working condition, and maintain it under load, once the plate temperature dropped during the "off" portion of the heating cycle. A much lower "on-off", or "high-low" temperature range of the cooking medium is desired, to save both heating energy and operating time. Prior attempts to solve that problem are exemplified by Pat. Nos. 2,846,147 and 3,511,971, for deep fat fryers and griddle plate, respectively, and the present invention is intended to be an improvement over the principles utilized in the said prior patents.

SUMMARY OF THE INVENTION

According to the present invention, more precise temperature control of a griddle plate is had by clamping a thermostat, whether of tubular or resistance type, directly against the under side of the griddle plate, mainly disposed away from direct engagement with the plate heating means and having a relatively small portion of its outward end exposed to and in direct engagement with said heating means, the main portion of the thermostat responding progressively to any changing temperature of the griddle plate, to effect control of the "on-off" switch means operating the heat energy source, and the said exposed portion directly supplementing the action of the main thermostat body to speed its response to the rate of plate temperature change, as it is affected by the immediately applied thermal energy, for more accurate operation of the switch means and energy source control.

By adjusting the amount of exposure of the exposed portion of the thermostat, i.e., ½ to ¾ of the exposed portion length, the actual on-off temperature range of operation of the heat source can be set to accommodate any size of griddle and to suit any range of the load that the griddle may be required to take in the course of its operation.

DESCRIPTION OF THE DRAWINGS

A specific embodiment of the invention as applied to a gas heated griddle plate, and a diagrammatic variation of the invention for an electrically heated griddle, are illustrated in the accompanying drawings, in which.

A PREFERRED EMBODIMENT OF THE INVENTION

Figure 1:
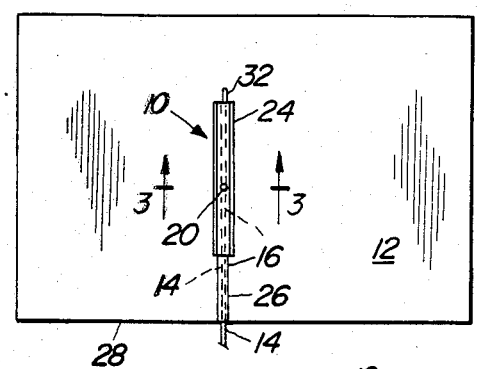
FIG. 1 is a bottom side view of a gas heated plate showing the positioning of the improved plate temperature control means.

As shown in FIG. 1 of the drawings, the thermostat assembly 10 is mounted on the bottom side of the griddle plate 12 at about the center of its principal working area and extends transversely of the plate so that the capillary 14 of the thermostat tube runs to the front edge of the plate for connection with the switch means for the gas burner system which is not shown.

Figure 2:
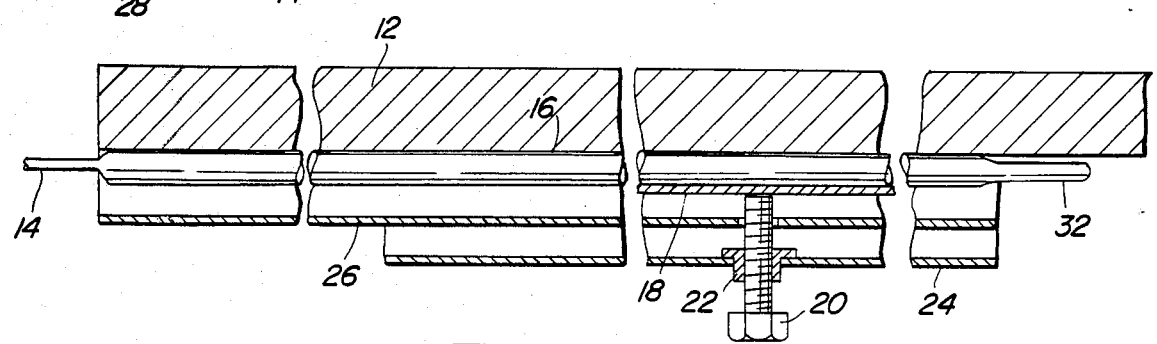
FIG. 2 is a sectional view of the same as taken on line 2—2 of FIG. 3.

The thermostat 16, which is of the tubular type with a fluid content, is shown in FIG. 2 and as shown is positioned squarely against the plate and clamped in place by a pressure plate 18 and a bolt 20 threaded through a nut 22, which is an integral part of an outer heat shield 24. In the form of the bolt assembly shown, the outer heat shield 24 extends substantially the length of the thermostat tube 16 sufficiently to shield it against engagement by the combustion gases of the plate heating system. On the other hand, the pressure plate 18 need be only of sufficient length to clamp the thermostat 16 firmly against the griddle plate 12.

Figure 3:
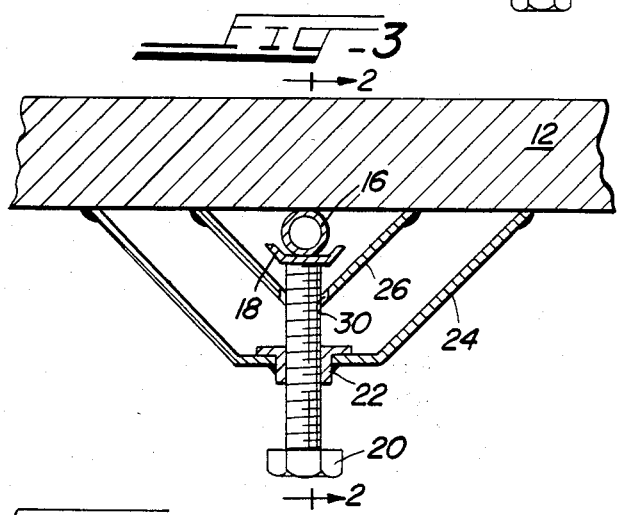
FIG. 3 is a sectional view of the same as taken on line 3—3 of FIG. 1.

As shown in FIGS. 2 and 3, the thermostat assembly 10 includes an inner heat shield 26 which extends substantially from end to end of the outer heat shield 24 and outwardly therefrom to the forward edge 28 of the plate 12 to protect the capillary 14 from the hot gases of the plate heating system. Preferably the heat shields 24 and 26 are welded to the bottom side of the plate 12 and, of course, the inner heat shield 26 is provided with an opening 30 through which the clamping bolt 20 can pass to engage the pressure plate 18.

As shown in FIG. 2, the thermostat bulb 32 projects from the outer end of the thermostat tube beyond the inner end of the heat shield 24 so as to be directly engaged by the gases of the plate heating system and the amount of that projection is readily adjustable, by merely loosening the clamping screw 20 and shifting the thermostat longitudinally beneath the pressure plate 18, as may be desired to accomplish the "on-off" temperature range desired for the particular griddle plate size and work load.

The exposed area of the thermostat, for example the projection of the bulb 32 as shown in FIG. 2, is determined by trial and error to arrive at that exposed area which will produce a minimum temperature drop without cycling, because if too large an area of the bulb 32 is exposed to the hot combustion gases, the thermostat will short cycle and the burners will not stay on for the time necessary to maintain the desired "off-on" temperature range for the griddle plate. Under no-load conditions, the control system will maintain a very accurate temperature, but under heavy-load conditions, the cycling off of the thermostat would impair the full flow of burner gas when it is required.

Once a particular thermostat is adopted, all of which have the same physical dimensions, with the same wall thickness for the bulb, the same metal for the bulb and the same hydraulic fluid, the amount of bulb extension, experimentally determined, can be the same for all grill installations of the same size and load condition.

As an example, a typical gas heated griddle may comprise a 36"×24" plate having a thermostat tube about 8" long with a bulb extension of one inch. The thermostat tube would be shielded from the gas flame and combustion products by a heat shield cover so that only about three-fourths of the one inch bulb extension length would be exposed for direct contact by the hot gases of the heating means. This extension exposure is determined by experimentation under actual conditions of griddle operation and, of course, must be determined for each size or manufacture of the particular thermostat employed for production griddle manufacture.

In operation of the gas heated griddle system and when the plate is below normal operating temperature, the hot gases of the combustion system will heat the projecting thermostat bulb to such an extent as to shut off the heat sooner than it otherwise would. The thermostat bulb then quickly attains the temperature of the griddle plate, which is lower than that of the gases which heat the plate, and the heating system is again turned on. This cycling repeats until the thermostat body attains the heat of the griddle and the burner is turned off. Thereafter, when the griddle plate temperature drops about 5 degrees, the thermostat cycles the heat system "on" and the plate is heated until the combination of the effect of the small exposed bulb portion, as it is affected by the hot gases of the heating system, and the griddle plate temperature affectation of the principal thermostat body causes the thermostatically actuated switch to reach the "off" position and the heat source is shut down. When the plate temperature cools enough for the thermostat to drop to the "on" position, the "on-off" cycle is repeated as long as any operation of the griddle is required.

A plate temperature variation within the range of 5° F. is believed to be a practical minimum and within that range when the griddle cycles "on", it will remain "on" continuously as long as the griddle plate and/or the load of food being cooked requires heat. That is, the small exposed portion of the thermostat bulb will not pick up sufficient heat to cause the thermostat to cycle "off" while the griddle plate is below the temperature setting of the thermostat dial.

From this and the foregoing, it will be seen that the distance of bulb extension beyond the heat shield of the thermostat is critical.

Figure 4:
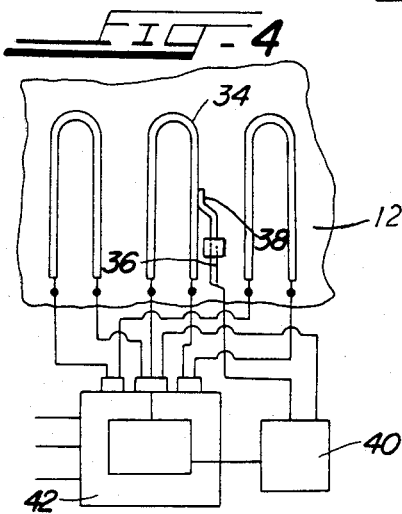
FIG. 4 is a diagrammatic view showing the positioning of a bulb type thermostat on an electrically heated griddle.

An adaptation of the foregoing system of griddle plate temperature control to an electrically heated griddle is illustrated diagrammatically by FIG. 4 of the drawings and as shown therein, the plate 12 is heated by a plurality of heating elements 34 of the "cal-rod" type suitably clamped flat and firmly against the bottom of the plate 12. A thermostat 36 is firmly clamped against the plate 12 near the center of the principal cooking area in spaced relation with an adjacent heating rod and a short-tip end portion 38 of the thermostat tube is bent laterally toward the said heating rod for side to side contact therewith to be directly affected by the temperature of the heating rod while principal length of the thermostat body is affected solely by the temperature of the plate 12.

In this case, the size of the bulb portion 38 having physical contact with the heating rod is determined experimentally, as in the case of the gas heated griddle system before described, and once determined becomes the standard for the electric system. As shown, the capillary of the thermostat connects with a thermostatically actuated switch 40 which in turn connects with the operating coil of a relay 42 for "on-off" operation of the heating elements 34, the switch dial being set for a temperature variation of about 5° F.

Although several adaptations of this invention have been herein shown and described, it will be understood that variations of the system described and means for effecting its performance may be altered without departing from the spirit of the invention as defined by the following claims.

I claim:

1. A heat control means for a cooking griddle plate comprising a source of thermal energy directly applied to the bottom side of the plate to heat the same and means for on-off operation of said energy source, said heat control means comprising an elongated temperature responsive body having a major portion of its length firmly positioned against the bottom side of said plate, and means spaced from said body for shielding substantially the entire length thereof, adjustable means for clamping the temperature responsive body against the bottom of said plate, said adjustable means extending through said shielding means and allowing said temperature responsive body to be moved longitudinally to directly expose a desired portion to and thermally influenced by said energy source.

2. A griddle heat control according to claim 1 wherein the source of thermal energy is a gas burner disposed so that its hot products of combustion impinge upon the said plate, and the said temperature responsive body is shielded from engagement by said combustion products except for its outer end portion which is exposed to be directly engaged by said combustion products.

3. A griddle heat control means according to claim 1 wherein the temperature responsive body is a thermostat comprising a fluid filled tube having one end connected with a pressure responsive switch means for on-off operation of the heat source and its opposite end portion is of relatively smaller section than that of the remainder of said tube.

4. A griddle heat control means according to claim 1 wherein the temperature responsive body extends transversely of the plate between the heat shield and the plate, and the clamping means comprises a pressure plate extending lengthwise of and engaging said body, and the said adjustable means is a bolt having threaded engagement with said heat shield and extending inwardly therefrom to bear against said pressure plate.

* * * * *